United States Patent [19]

Eckel, Jr. et al.

[11] Patent Number: 5,373,151
[45] Date of Patent: Dec. 13, 1994

[54] OPTICAL SYSTEM INCLUDING FOCAL PLANE ARRAY COMPENSATION TECHNIQUE FOR FOCUSING AND PERIODICALLY DEFOCUSING A BEAM

[75] Inventors: Robert A. Eckel, Jr., Andover; Gordon C. MacKenzie, Billerica; Joseph C. Ottney, Lowell, all of Mass.

[73] Assignee: Raytheon Company, Lexington, Mass.

[21] Appl. No.: 130,972

[22] Filed: Oct. 4, 1993

[51] Int. Cl.⁵ .................................. H01J 40/14
[52] U.S. Cl. ............................. 250/208; 250/216; 250/332; 359/726
[58] Field of Search .............. 250/208.1, 216, 203.1, 250/206.1, 206.2, 201.9, 332, 349; 359/726–729, 732–733

[56] References Cited

U.S. PATENT DOCUMENTS

| | | |
|---|---|---|
| 3,872,308 | 3/1975 | Hopson et al. |
| 4,123,136 | 10/1978 | Dahab et al. ............ 250/203.6 |
| 4,339,959 | 7/1982 | Klaus, Jr. et al. |
| 4,664,515 | 5/1987 | Imura et al. ............ 359/730 |
| 5,072,890 | 12/1991 | Klaus, Jr. et al. |
| 5,093,740 | 3/1992 | Dorschner et al. |

Primary Examiner—David C. Nelms
Assistant Examiner—Que T. Le
Attorney, Agent, or Firm—Donald F. Mofford

[57] ABSTRACT

An imaging optical system is described including an array of photodetectors, each photodetector having a surface, and a focusing system for focusing a beam of electromagnetic infrared energy on the surface of at least one of the photodetectors. The focusing system further includes a technique for periodically defocusing the beam of electromagnetic infrared energy on the surface of at least one of the photodetectors. With such an arrangement, a scanning and focusing system is provided wherein fixed pattern noise can be decreased.

8 Claims, 13 Drawing Sheets

OPTICAL SYSTEM INCLUDING FOCAL PLANE ARRAY COMPENSATION TECHNIQUE FOR FOCUSING AND PERIODICALLY DEFOCUSING A BEAM

BACKGROUND OF THE INVENTION

This invention relates to imaging optical systems and more particularly to imaging optical systems utilizing a staring two-dimensional matrix array of detectors disposed in a focal plane for image detection and processing.

As is known in the art, optical systems have a wide variety of applications including use in infrared missile seekers. One type of an infrared missile seeker includes a gimballed focusing system for focusing infrared energy from an external scene which may include a target, into an image on a focal plane within the seeker. At the focal plane, an array of detectors are disposed for detecting infrared energy impinging thereon, the signals produced by the array of detectors indicating the presence and characteristics including location on the field-of-view of a target as well as other background objects.

Various methods of processing infrared energy to obtain an indication of a target include the techniques disclosed in U.S. Pat. No. 3,872,308, issued Mar. 18, 1975, inventors James E. Hopson and Gordon G. MacKenzie, U.S. Pat. No. 4,339,959, issued Jul. 20, 1982, inventors Benjamin Klaus, Jr. and Gordon C. MacKenzie and U.S. Pat. No. 5,072,890, issued Dec. 17, 1991, inventors Benjamin Klaus, Jr., Gordon C. MacKenzie and Richard A. Beckerleg, U.S. Pat. Nos. 3,872,308, 4,339,959 and 5,072,890 being assigned to the same assignee as the present invention and incorporated herein by reference.

An infrared seeker with a detector array disposed at a focal plane forms an image (i.e. picture) of a scene within the field of view of the infrared seeker. The image is formed from a plurality of pixels (i.e. picture elements) with each pixel corresponding to each detector element of the detector array. For example, a 128×128 element detector array would provide an image with 128×128 pixels and a 256×256 element detector array would provide an image with 256×256 pixels. For images that are to be further processed by a computer, the image would most likely be represented by an array of digital words, with each word indicative of the intensity of the infrared energy from a small area within the instantaneous field-of-view corresponding to one detector element of the detector array. Thus, the outputs from the detector array are digitized by an analog to digital converter and an image is provided as a two dimensional array of pixels, each pixel represented by a digital word. The image is then processed by a computer or processor as is known.

One problem with an infrared seeker using a focal plane array is that each detector in the array of detectors has varying characteristics including a DC offset voltage and gain/responsivity due to physical and electrical irregularities. These varying characteristics result in noise like image irregularities (commonly referred to as fixed pattern noise) which are largely uncorrelated in space (i.e., from element to element) and relatively fixed in time (i.e., from frame to frame). To minimize these varying characteristics, improved production processes are used to reduce the physical and electrical irregularities. Although adequate for some instances, additional compensation is generally required to further reduce the fixed pattern noise, particularly in imaging infrared applications.

SUMMARY OF THE INVENTION

With the foregoing background in mind, it is an object of this invention to provide a technique for reducing fixed pattern noise.

Another object of this invention is to provide a technique for improving the target detection capability of an infrared seeker.

The foregoing and other objects of this inventions are met generally by an imaging optical system including an array of photodetectors, each photodetector having a surface, and a focusing system for focusing an external scene into an image at a focal plane located on the array of photodetectors. The focusing system further includes a technique for periodically defocusing the image on the array of photodetectors. With such an arrangement, a focusing system is provided wherein fixed pattern noise can be decreased.

In accordance with another aspect of the present invention, an imaging infrared optical system for receiving a beam of infrared energy includes a primary mirror and a secondary mirror disposed in a catadioptric telescope arrangement and a plurality of relay lenses to focus the beam of infrared energy upon a detector array disposed within the beam of the infrared energy to detect the infrared energy. The imaging optical system further includes means for dithering the secondary mirror lens element or one of the relay lenses for defocusing the beam of infrared energy upon the detector array. With such an arrangement, a technique for improving the detection capability of an infrared seeker is provided.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Figure 1:
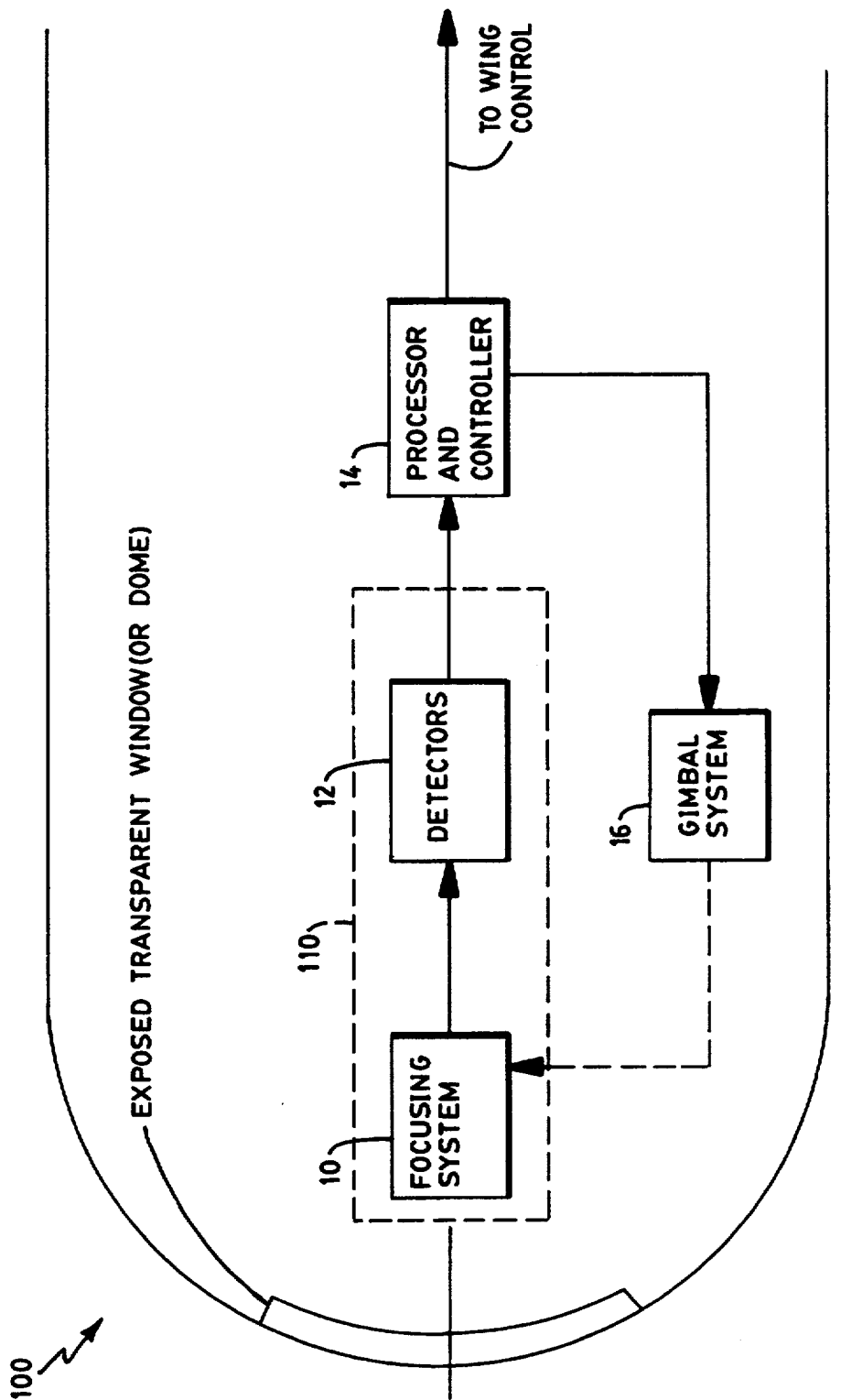
FIG. 1 is a block diagram of a missile utilizing a focusing system according to the invention.

Referring now to FIG. 1, a missile 100 is shown to include an infrared seeker 110. The infrared seeker 110 includes a focusing system 10 for receiving infrared energy emitting from an external scene with an imbedded target (not shown) and focusing the infrared energy onto an array of detectors 12. An output image from the array of detectors 12 is fed to a computer processor and controller 14 wherein the image is processed such that guidance control signals are produced to effectuate control of the course of the missile 100. The processor and controller 14 also provides control signals to a gimbal system 16 to control a pointing angle of the focusing system 10. In a tactical missile 100, the array of detectors 12 typically require a large dynamic range due to a generally low thermal scene contrast, which is further reduced by atmospheric path losses. Fixed pattern noise becomes more apparent with an array of detector elements having a large dynamic range.

Figure 1A:
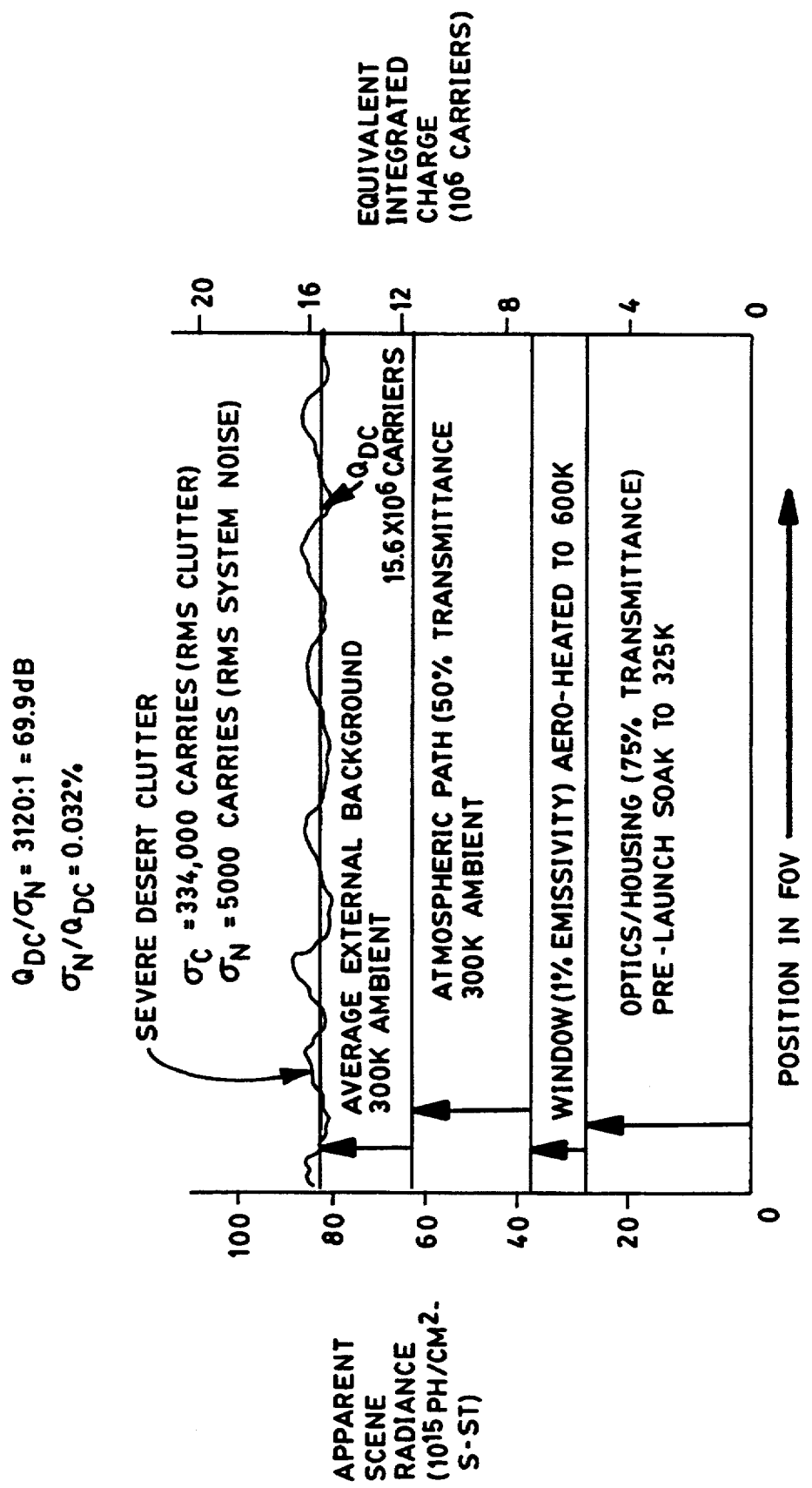
FIG. 1A is a graphical representation of apparent scene radiance components for a typical LWIR (8.0–9.2 $\mu$m) seeker in a typical tactical engagement.

FIG. 1A illustrates the net apparent scene radiance for a typical long wave infrared (LWIR) seeker (i.e., 8.0–9.2 μm band) in a typical tactical look-down engagement against severe desert clutter (i.e., with a 7.3° C. RMS Temperature variation) and may be used to provide insight into the nature of the problem as well as representative numerical examples indicating the advantages of the invention in comparison to other known compensation techniques. To facilitate these numerical discussions, the radiance values are indicated in not only common radiometric units (i.e., photons per square centimeter per second per steradian), but also the integrated charge (i.e., in charge carriers; electrons or holes) for a typical detector element (i.e., with average responsivity/gain and no electrical offset).

The net apparent radiance values illustrated in FIG. 1A are shown to include a large spatially constant (i.e., spatial DC) term at 15,600,000 carriers and a small spatially varying clutter term with an RMS variation of 334,000 carriers (i.e., only 2.1% of the spatial DC term). The nominal RMS system noise due to shot noise alone (i.e., charge quantization) is readily determined as the square root of the spatial DC term or 3950 carriers. Including other typical noise sources (e.g., thermal or Johnson noise from electronic components), the net RMS system noise is estimated at 5000 carriers. Unlike fixed pattern noise, this unavoidable system noise is uncorrelated both spatially (i.e., from element-to-element in the detector array) and temporally (i.e., from frame-to-frame) and thereby sets the limiting performance achievable with perfect fixed pattern noise compensation. RMS systems noise is 15,600,000/5000=3120 (69.9 dB). In order to achieve system noise limited operation (i.e., with minimal effect due to fixed pattern noise), the residual RMS fixed pattern noise after compensation must then be less than 1/3120=0.032% of the spatial DC term. This large dynamic range and correspondingly low percentage of correction required to effectively eliminate fixed pattern noise is a key feature of the problem, particularly in imaging infrared systems.

The spatial DC term in FIG. 1A is shown to result from (as least) four components: 1) emission and reflection from the average external background scene as seen through the atmosphere, exposed window, and internal optics; 2) emission and scatter from the atmospheric path as seen through the window and optics; 3) emission and reflection from the aerodynamically heated window as seen through the optics; and 4) emission and reflection from the internal seeker optics. Another key feature of the problem is that the net apparent spatial DC radiance can vary both significantly and rapidly due to changes in any of these components. In particular, the external scene can change rapidly (e.g., by slewing from a warm earth to a cool sky background), and the temperature of the exposed window can change at rates in excess of 100° C. per second (e.g., during launch boost).

A known technique for correcting fixed pattern noise includes adding one or more actively controlled reference source elements which can be periodically moved into the optical path (e.g. in a convenient out of focus position) to provide uniform common radiometric reference surfaces for all of the detector elements in the focal plane array. A single reference source provides data sufficient to dynamically correct for all element to element output variations at the reference source radiance. It is then effective in compensating for both temporal offset drifts and output variations at the reference source radiance which result from element to element offset variations. The latter does not provide for dynamic gain correction and thus must rely on stored gain correction coefficients (i.e. in a look up table) derived from a one time calibration.

It should be appreciated that residual pattern noise error after single point correction, i.e. after subtraction of a reference frame from an image frame, results from gain error modulation of the differential radiance between the two frames. If we normalize the average gain of all detector elements to unity (to permit direct input and output comparisons of radiance), the RMS residual pattern noise error may be derived from the equation:

$$\sigma_p{}^2 = \sigma_G{}^2 (L_{DC} - L_{REF})^2 + \sigma_G{}^2, \sigma_c{}^2 \qquad \text{Eq. 1}$$

where $\sigma_p$ = equivalent residual RMS pattern noise radiance,
$\sigma_G$ = RMS element to element relative gain variation,
$L_{DC}$ = mean apparent scene radiance,
$L_{REF}$ = reference source radiance, and
$\sigma_c$ = apparent RMS clutter radiance variation.

The first term of equation one results from gain error modulation of the DC difference between the mean scene radiance (including all contributions) and the reference source radiance and is present even in the absence of any background scene clutter detail (e.g. blue sky background). In a laboratory environment, where the external scene, atmospheric path, dome and infrared window, internal optics and housing and internal reference are all at about the same temperature, the radiance difference is generally quite small and acceptable performance can usually be obtained with achievable RMS gain errors (after using a look up table for correction) of one to two percent. In a tactical environment, the mean apparent scene radiance will vary significantly due to aero-heating and external scene conditions (e.g. cool sky versus warm earth background) resulting in significant differences from the internal reference. For example, a ten percent reference radiance offset (e.g., due to hot window contribution) coupled with a one percent RMS gain variation would produce a residual RMS pattern noise variation of approximately 15,600 carriers. While this represents an improvement over an uncorrected system, it still exceeds the RMS system noise characteristic requirements (i.e., 5000 carriers). It should be appreciated that the simple subtraction of two frames would normally increase the uncorrelated RMS system noise by a factor of $\sqrt{2}$ or 3 dB. This factor is not included in our discussion since averaging of multiple reference frames is often used to reduce the reference frame RMS noise contribution and this factor falls outside the scope of the problem addressed herein.

The second term in equation one results from gain error modulation of the spatially varying background scene clutter including spatial low-pass filter reduction of the clutter amplitude by the sensor modulation transfer function (MTF) (i.e., optics and detector MTF's). Since the clutter variation is usually quite small compared to the DC radiance levels (e.g., zero with no clutter and 2.1% in FIG. 1A), this term is generally negligible compared to the first. It should be appreciated that MTF is a measure of sensor resolution, that is the difference of the observed maxima and minima amplitudes divided by the sum of the maxima and minima.

The use of two reference sources (two point correction) provides data sufficient to dynamically correct for both offset and gain drift variations with residual errors resulting only from nonlinearities. With a reasonable selection of reference radiances (e.g., temperatures) to anticipate the expected range of apparent scene radiances, two point correction can significantly reduce pattern noise levels. The disadvantage of two point correction is that it is generally more complex to implement. It not only requires periodic insertion of two reference sources, but requires at least one of the sources to be actively controlled or stabilized in temperature with a time constant compatible with short seeker start up time requirements (e.g. five to ten seconds).

In a seeker environment, the frequency of calibration must be selected appropriate to the anticipated operating environment. For example, calibration every few seconds or even minutes may be adequate in a laboratory environment, but in an operational environment wherein the seeker is experiencing severe and rapid changes in temperature and scene conditions, the frequency of calibration must approach or equal the frame rate if near optimal correction is to be maintained. This cannot effectively be done with active reference source.

The correction technique described herein is a variation of the single point technique described above wherein a defocused image is used as the reference frame instead of an internal reference source. The defocused image technique does not require reference temperature controls and therefore retains the simplicity of the basic single point technique. The defocused image technique does not provide data for dynamic gain correction and must rely on stored gain correction coefficients (i.e., in a look up table) derived from a one time calibration with estimated long term gain RMS errors on the order of one to two percent. An advantage provided by using a defocused image of the scene as a reference is that the "scene based reference" automatically adjusts to changing radiometric and temperature conditions from all sources (i.e., external scene, atmospheric path, window and internal optics and housing) thereby eliminating the difference between the mean scene radiance and the reference radiance.

Figure 2B:
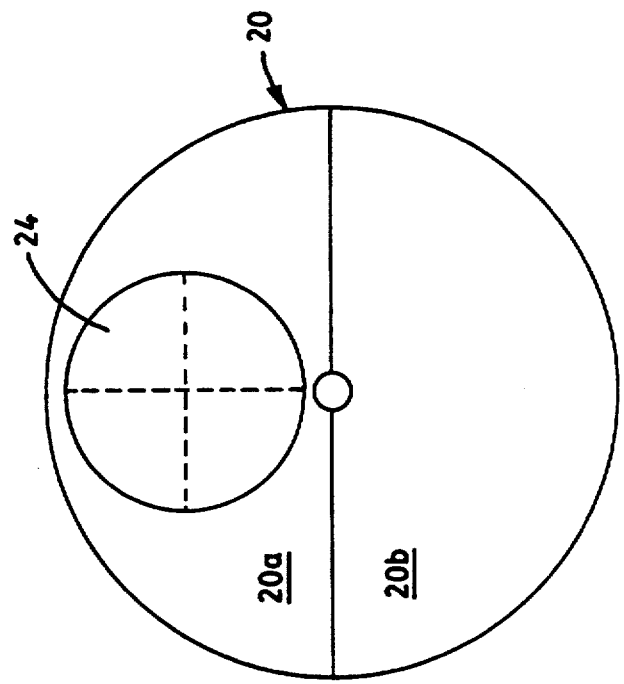
FIGS. 2A and 2B are diagrammatical sketches explaining a technique for focusing and defocusing a beam of energy according to the invention.
Figure 2A:
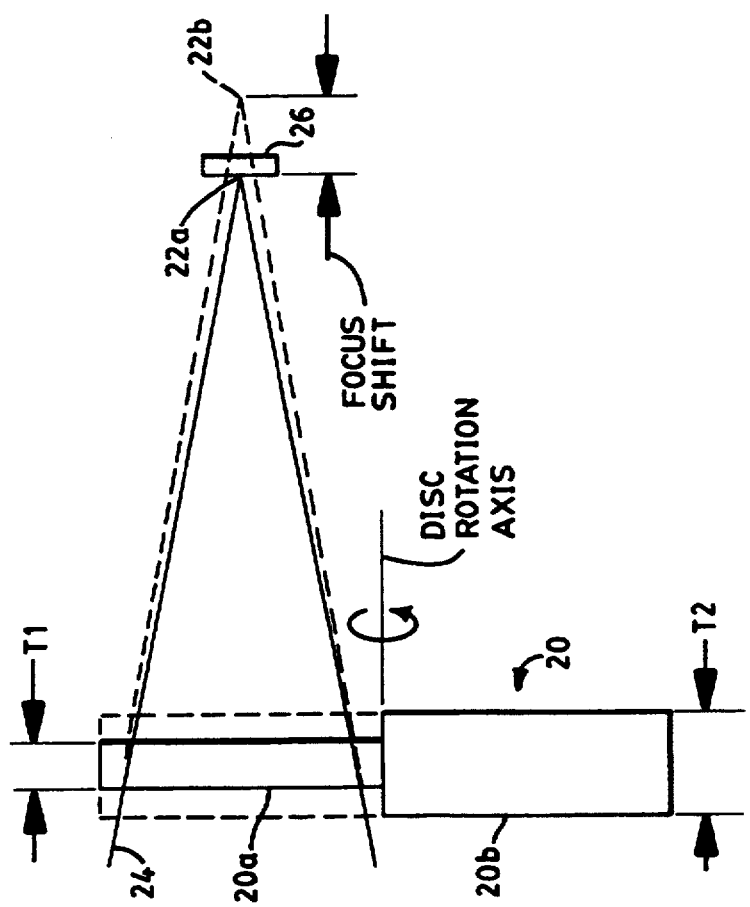

Referring now to FIGS. 2A and 2B, it should be appreciated that a converging beam of electromagnetic infrared energy 24 (i.e. infrared energy) passing through a first portion 20a of a dielectric disc 20, the first portion 20a having a thickness T1, will have a focal point 22a. If the dielectric disc 20 is rotated such that a second portion 20b having a thickness T2 of the dielectric disc 20 is in the path of the diverging beam of electromagnetic infrared energy 24, then the focal point will shift to focal point 22b. If a detector array 26 is disposed at a location coincident with focal point 22a, then the beam of electromagnetic infrared energy 24 will be in focus with the detector array 26 when the first portion 20a is disposed in the path of the beam of electromagnetic infrared energy 24. When the second portion 20b of the dielectric disc 20 is in the path of the beam of electromagnetic infrared energy 24, then the beam of electromagnetic infrared energy 24 will be out of focus with the detector array 26. By rotating the dielectric disc 20, the beam of electromagnetic infrared energy can be periodically focused and defocused upon a detector array 26 coincident at the focal point 22a such that an in-focus image and an out-of-focus image can be respectively sampled by the detector array 26. The latter allows for precise defocus by the insertion of a variable thickness flat plate in such a manner that DC response and magnification are maintained as required. In the focusing system 10 of FIG. 1, the dielectric disc 20 is fabricated from silicon with the thickness T1 having a value 0.030 inches and the thickness T2 having a value 0,150 inches.

Figure 2C:
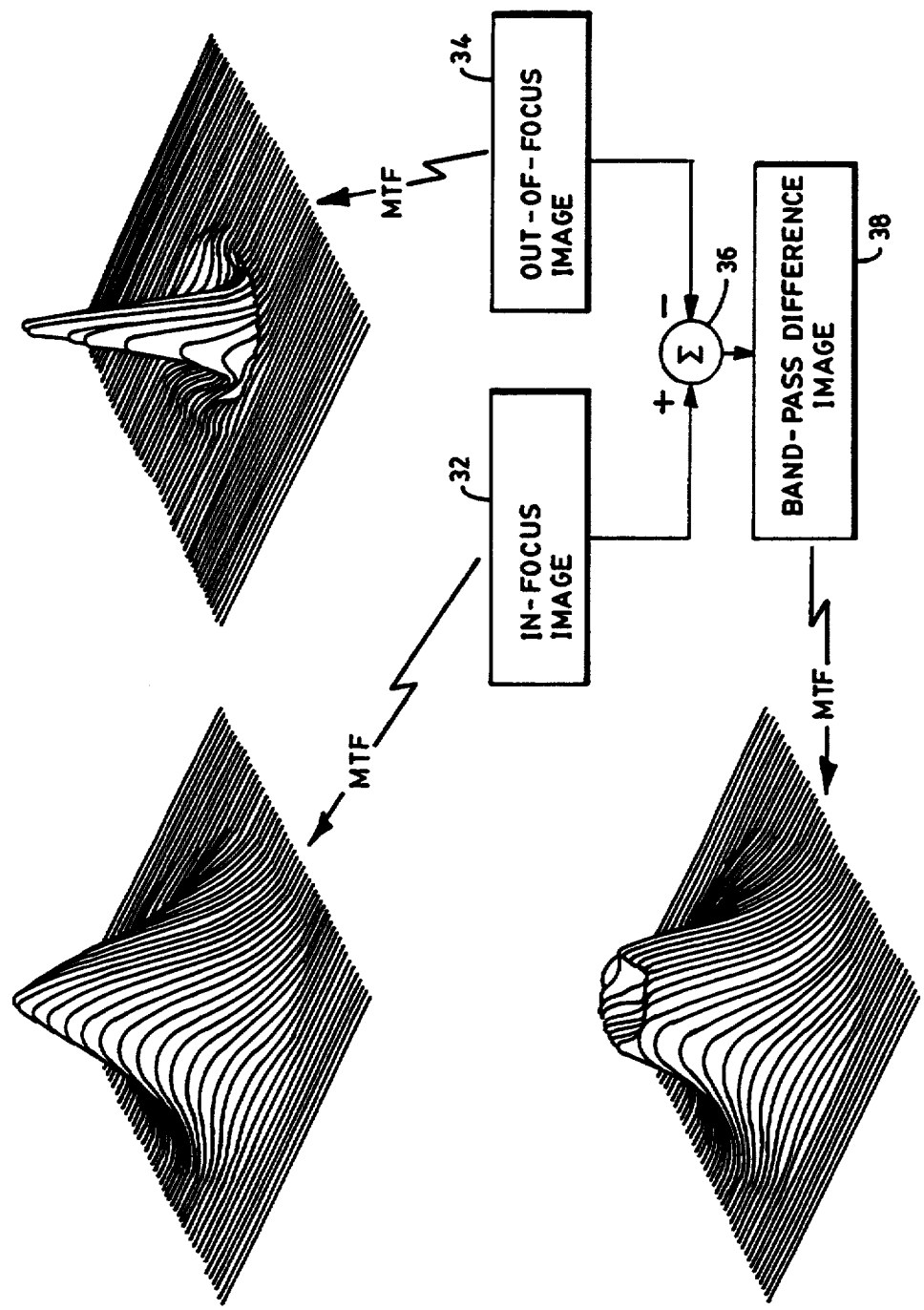
FIG. 2C is a flow chart diagram showing the technique for processing images according to the invention.

Referring now to FIG. 2C, a block diagram of a correction technique, which requires a simple sample by sample subtraction of an out-of-focus image 34 from an in-focus image 32 by a subtractor 36 to provide a band-pass difference image 38. It should be appreciated that pattern noise correction must be done on each detector element individually without crossing detector boundaries. The corresponding modulation transfer function (MTF) curve for each image illustrates that, in addition to correction, the process also provides a spatial (two-dimensional) bandpass filter which not only removes the DC offset but also attenuates lower spatial frequencies. The extent of the low frequency removal depends on the amount of defocus selected for the out-of-focus image (with the obvious degenerate case of no defocus resulting in the elimination of all scene response). If we again normalize the average gain of all elements to unity ( to permit direct input and output comparisons on a radiance or effective integrated charge basis), the RMS residual pattern noise error may be derived from the equation:

$$\sigma_p = \sigma_G \sigma'_c \qquad \text{Eq. 2}$$

where
$\sigma_p$ = equivalent residual RMS pattern noise radiance,
$\sigma_G$ = RMS element to element relative gain variation and $\sigma'_c$ = apparent RMS clutter radiance variation (including spatial band-pass filtering losses by the sensor difference MTF function).

Equation two differs from equation one in that the DC gain modulation term (i.e., the first term due to the difference between the mean scene radiance and the reference source radiance) is eliminated. For a uniform (e.g., blue sky) background engagement, in which the in-focus and out-of-focus images are virtually identical, the residual pattern noise error after subtraction is essentially zero independent of the amount of residual gain error. This result, which ensures substantially perfect correction when target detection is totally limited by noise rather than clutter (wherein pattern noise is most apparent), is indicative of the adaptive nature of this inventive technique. This technique tends to reduce the impact of gain drift errors under substantially all conditions.

The remaining term of equation two results from gain error modulation of the spatially varying background scene clutter and is similar to the second term of equation one. The band-pass spatial filter resulting from the subtraction of the out-of-focus image 34 from the in-focus image 32 will, however, reduce the apparent clutter amplitude significantly below the single point technique resulting in even lower pattern noise residuals. Suffice it to say the difference between the in-focus clutter and the out-of-focus clutter is smaller than the difference between the in-focus clutter and a DC reference at the mean scene radiance.

The amount of defocus selected in the out-of-focus image 34 requires an application dependent tradeoff between loss of target signal and reduction of clutter modulation effects. It should be apparent that a small defocus results in significant band-pass filter attenuation of higher target spatial frequencies and a large defocus results in very little attenuation of low frequency scene clutter.

Figure 2D:
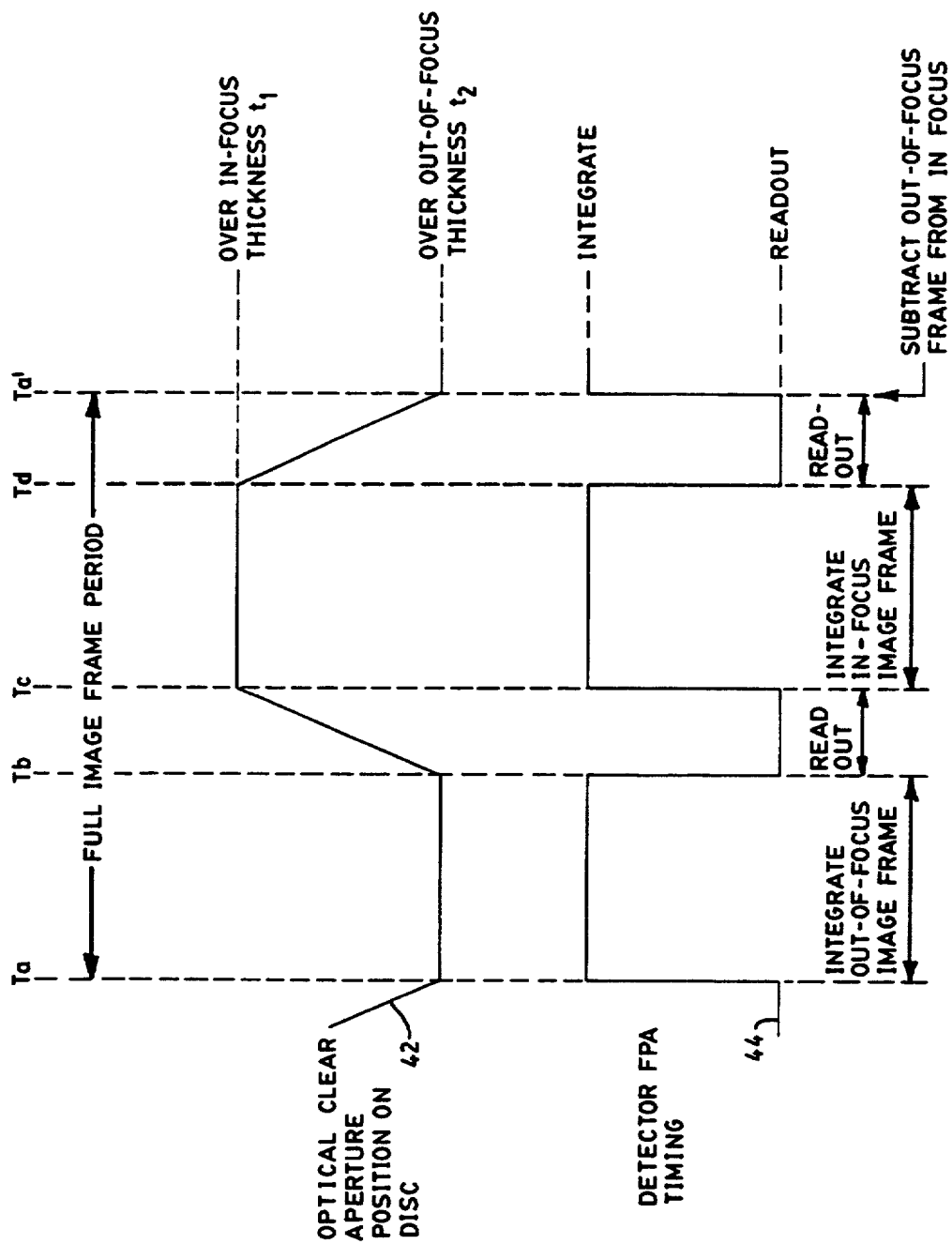
FIG. 2D is a sketch of a timing diagram showing one relationship between a rotating disc dither mechanism LCD and detection by the array of detectors according to the invention.

Referring now to FIGS. 2A, 2B, 2C and 2D, a typical timing diagram of the required processing is shown in FIG. 2D. A line 42 shows the positional relationship of the dielectric disc 20. At a time $T_a$, the second portion 20b is in the field of view of the beam of electromagnetic infrared energy 24 and remains in the field of view of the electromagnetic infrared energy 24 until a time $T_b$. During a period of time from the time $T_b$ to a time $T_c$, the field of view of the beam of electromagnetic infrared energy 24 transitions from the second portion 20b to the first portion 20a of the dielectric disc 20. During a period of time from the time $T_c$ to a time $T_d$, the field of view of the beam of electromagnetic infrared energy 24 is through the first portion 20a of the dielectric disc 20. During a period of time from the time $T_d$ to a time $T_a$, the field of view of the beam of electromagnetic infrared energy 24 transitions from the first portion 20a to the second portion 20b of the dielectric disc 20 and then the cycle repeats itself.

A line 44 shows the required timing for processing signals from the detector array 26. During a period of time from the time $T_a$ to a time $T_b$, the field of view of the beam of electromagnetic infrared energy 24 is through the second portion 20b of the dielectric disc 20 and the out-of-focus image is integrated by the detector array 26. During a period of time from the time $T_b$ to a time $T_c$, the field of view of the beam of electromagnetic infrared energy 24 transitions from the second portion 20b to the first portion 20a of the dielectric disc 20 and the data collected during the time $T_a$ to $T_b$ is read. During a period of time from the time $T_c$ to a time $T_d$, the field of view of the beam of electromagnetic infrared energy 24 is through the first portion 20a of the dielectric disc 20 and the in-focus image is integrated by the detector array 26. During a period of time from the time $T_d$ to a time $T_a$, the field of view of the beam of electromagnetic infrared energy 24 transitions from the first portion 20a to the second portion 20b of the dielectric disc 20 and the data collected during the time $T_c$ to $T_d$ is read. The cycle then repeats itself.

Figure 3A:
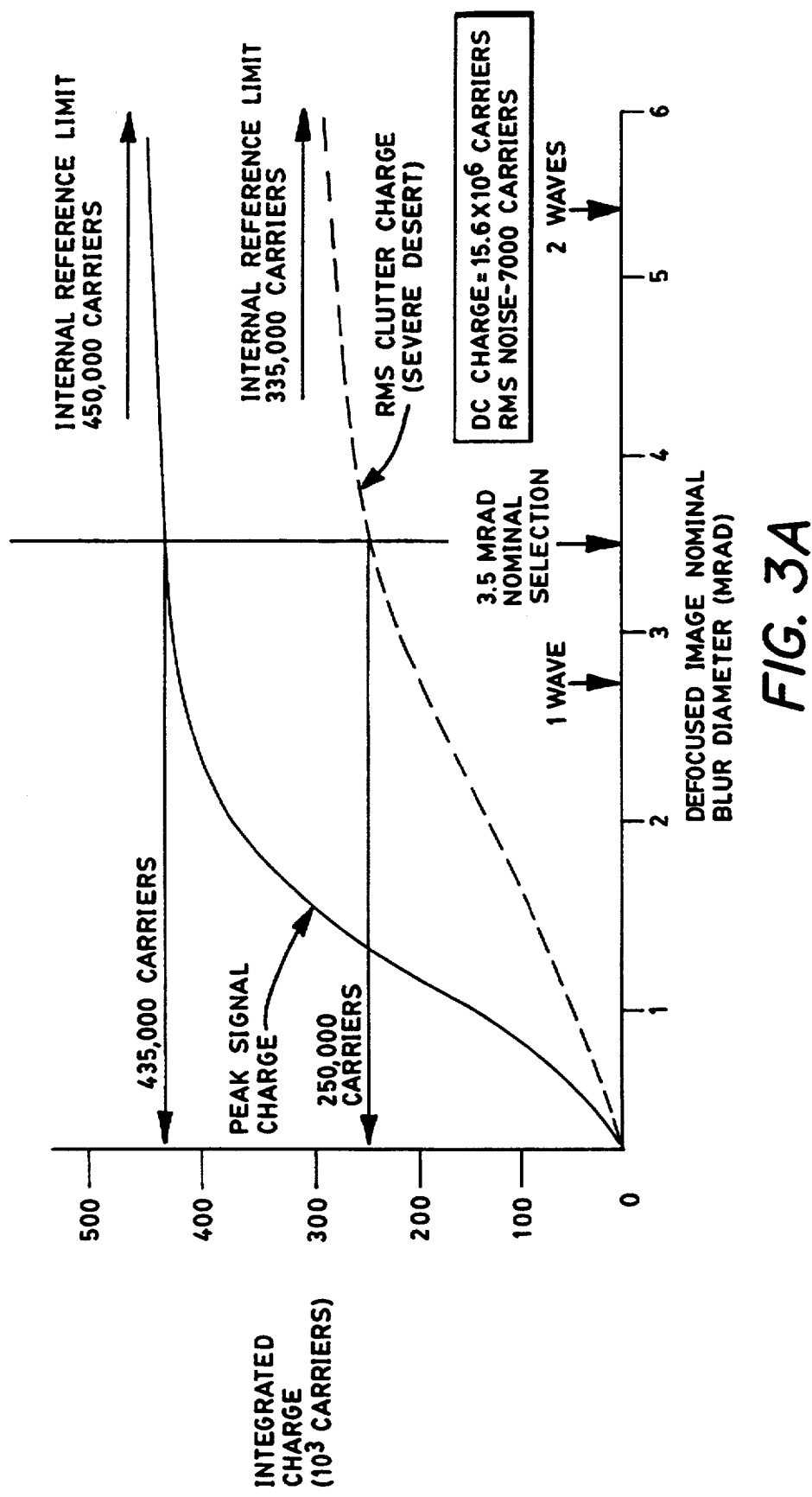
FIG. 3A is a plot of the peak output target signal and the output RMS clutter versus the amount of defocus in the out-of-focus reference image for a tactical seeker in a typical engagement condition.
Figure 3B:
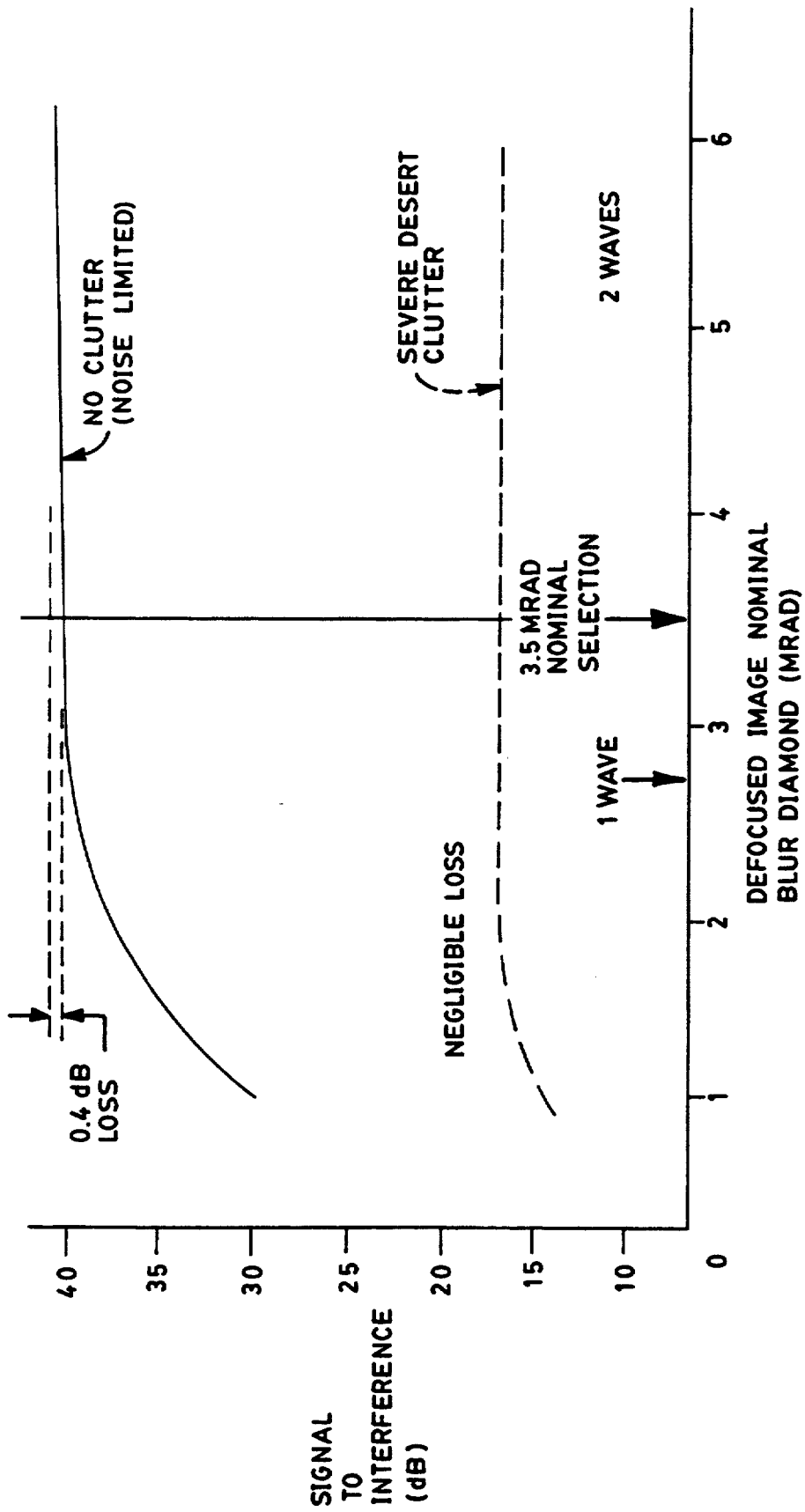
FIG. 3B shows corresponding plots of predicted signal to interference ratio after two-dimensional (single frame) matched filter processing versus the amount of defocus for a noise limited conditions (no clutter) and a severe desert clutter condition, respectively.

Referring to FIG. 3A, a plot is shown of the peak output target signal and the output RMS clutter versus the amount of defocus in the out-of-focus reference image for a tactical seeker 110 (FIG. 1) in a typical engagement condition. FIG. 3B shows corresponding plots of predicted signal to interference ratio after two-dimensional (single frame) matched filter processing versus the amount of defocus for a noise limited (no clutter) and a severe desert clutter condition, respectively. FIGS. 3A and 3B indicate a strong dependence on the amount of defocus up to about 3.0 mrad diameter (i.e. 1.1 waves or 6.8 times the IFOV width) with relatively flat response for a larger amount of defocus. A reasonable defocus selection in this case would be larger value of 3.5 mrad (i.e. 1.3 waves or 8.0 times the IFOV width) to allow for analytic and fabrication uncertainties (e.g., for larger target size or in-focus image thermal defocus) with very little increase in output RMS clutter (14 percent or 1.1 dB form 3.0 mrad to 3.5 mrad as shown in FIG. 3A).

With a relatively large defocus of 3.5 mrad, the effect of the band-pass filtering is virtually negligible resulting in only 3.3 percent (0.3 dB) loss in peak signal and 4.7 percent (0.4 dB) loss in the signal-to-interference ratio at the two dimensional matched filter output even with noise limited detection (i.e., virtually no loss in clutter limited performance). The filtered severe desert RMS clutter variation of 250,000 carriers coupled with a one percent RMS gain variation will produce a residual RMS pattern noise variation of only 2500 carriers, a factor of 2.0 below a system RMS noise of 5000 carriers. An RMS gain variation of up to two percent can then be allowed before the RMS pattern noise due to gain error modulation of even severe desert clutter approaches the RMS system noise.

It should be appreciated the defocusing technique requires a constant detector DC response, i.e., the spatial DC response of the sensor must be the same when either in the in-focus or out-of-focus image position. More particularly, the optics transmission and effective F/number with respect to each of the individual radiation sources (i.e., external scene, window, and optics and housing) should not change appreciably. The constant DC response requirement is necessary to avoid a residual DC difference between the in-focus and out-of-focus frames which would have an effect similar to the DC variation between the mean scene radiance and the reference source radiance in the single point calibration technique (except that the difference would be a constant fraction of the mean scene radiance rather than an uncontrolled variable dependent on aero-heating and external scene conditions). For example, a ten percent DC response variation coupled with a one percent RMS gain variation would yield the same residual RMS pattern noise variation of 15,600 carriers as provided with the single point technique exceeding the RMS noise requirement of 5000 carriers by a factor of 3.12 to 1. However, with a reasonable achievable DC response variation limit of one percent (e.g., due to transmittance variation tolerances), the RMS pattern noise can be limited to 1560 carriers or a factor of 3.21 below the system noise level.

The defocusing technique also requires constant optical detector magnification meaning the image magnification of the detectors 12 (FIG. 1) must be essentially the same when the dielectric disc 20 is in the in-focus position or the out-of-focus position. In particular, the chief ray from any off-axis position in the field-of-view should hit the detector plane at essentially the same position in either focus position. The effect of the magnification change is to produce a variation in the band-pass filter characteristics (in the difference image) over the field of view. This variation is obviously undesirable, particularly with multi-frame signal processing techniques, but difficult to quantify in general (i.e., application dependant). A center to center blur shift up to ten percent of the out-of-focus image blur diameter may, however, be assumed to be acceptable. For the 3.5 mrad out-of-focus blur diameter, this maximum shift is approximately 0.35 mrad.

The defocusing technique still further requires limited image roll meaning the scene image should not roll excessively on the detector plane during the time interval between the collection of in-focus and out-of-focus frame data. This limitation is again required to prevent excessive variations in the band-pass filter characteristics (in the difference image) over the field of view. The effect of image roll is similar to the effect of a magnification variation as noted above except that the blur center shifts for off axis positions in the field of view is rotational rather than radial.

In a typical seeker engagement with a 60 Hz frame rate and a 3.2 degree field of view, calibration at the frame rate provides an out-of-focus frame for every in-focus frame with a half period temporal spacing of 8.33 milliseconds between the two frames. To limit the frame-to-frame motion at the corners of the field of view to less than 0.35 mrad (i.e., ten percent of the 3.5 mrad out-of-focus blur diameter), the roll rate must be maintained below 61 degrees per second. This requirement is in general readily achievable in modern roll-controlled missiles (at least during target acquisition) without the addition of a roll gimbal axis.

It should be noted that simple lateral pitch and yaw translations between the in-focus image 32 and the out-of-focus image 34 will also produce an effective variation in the band-pass filter characteristics with respect to the moving scene clutter. However, the variation in this case is uniform over the field of view and, except for a slight increase in the amount of scene clutter in the difference image, the motion should have minimal effect on performance.

Figure 4A:
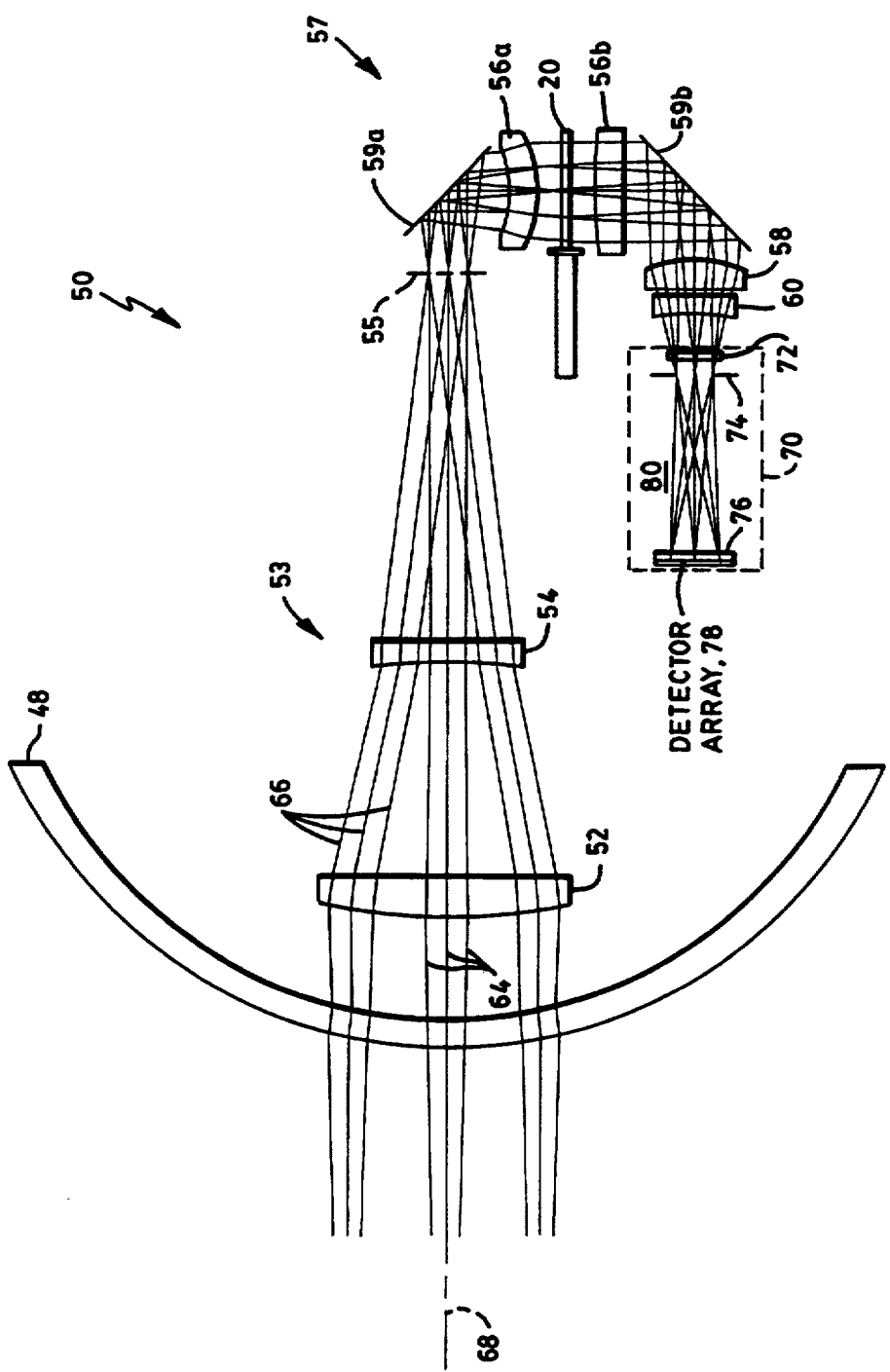
FIG. 4A is a diagrammatical cross-sectional view of a portion of an infrared seeker according to the invention.
Figure 4B:
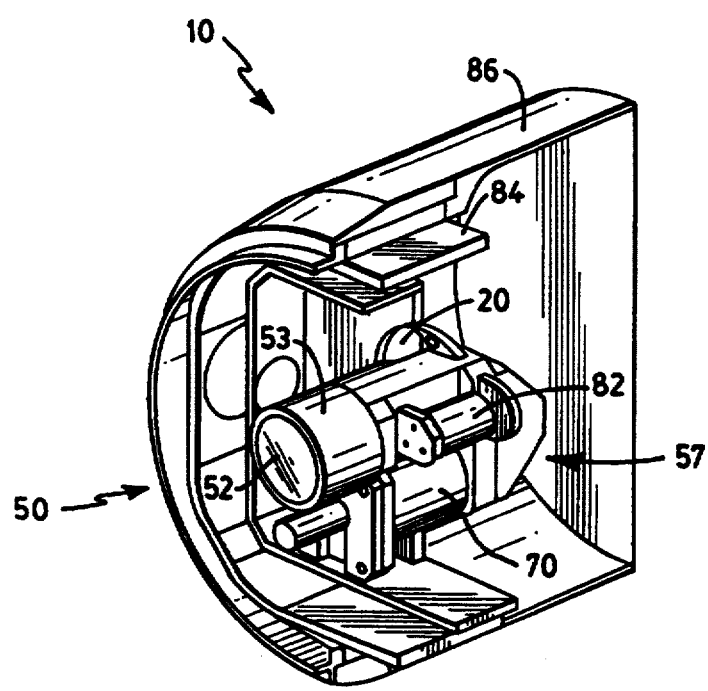
FIG. 4B is an isometric view partially torn away of an infrared seeker according to the invention.

Referring now to FIGS. 1, 4A and 4B, an optical system 50 which is implemented in the focusing system 10 of the missile 100 is shown to include a forward optics assembly 53 including lens 52 and lens 54. The lens 52 is here fabricated from silicon and is acting as a primary objective lens. The lens 54, here fabricated from germanium and acting as a secondary objective lens, is disposed adjacent the lens 52 for focusing the axial rays 66 of infrared energy onto a focal plane 55. The optical system 50 further includes a rotating dielectric disc 20 having a center and a first portion with a first thickness and a second portion with a second different thickness, the rotating dielectric disc 20 disposed with the center of the rotating dielectric disc 20 outside the field of view of the infrared energy propagating therein such that periodically the first portion of the rotating dielectric disc 20 is disposed within a beam of infrared energy and alternatively the second portion of the rotating dielectric disc 20 is disposed within the beam of infrared energy. The rotating dielectric disc 20 is rotated by a motor 82 at a rotation rate in response to control circuitry (not shown) relative to the detector array frame rate.

The optical system 50 still further includes an aft optics assembly 57 including lenses 56a and 56b here fabricated from silicon and disposed juxtapositional with the rotating dielectric disc 20. Lenses 56a and 56b together act as a field lens to project the image of the cold shield 74 to an entrance pupil (not shown) forward of the optical system 50. Lens 56a, in addition, focuses the chief rays 64 or the infrared energy into parallel rays along the optical axis 68 where they intersect the rotating dielectric disc 20. The aft optics assembly 57 further includes a pair of folding mirrors 59a, 59b disposed within the beam of infrared energy to reverse the direction of the beam of infrared energy. A lens 58, here fabricated from silicon, and a lens 60, here fabricated from germanium, cooperate to refocus the beam of infrared energy into a Dewar flask 70. The Dewar flask 70 includes an evacuated chamber 80 for enabling a suitable cryogenic substance to cool a detector array 78. A spectral filter 76 is disposed adjacent the detector array 78 for eliminating radiation at undesired wavelengths. A cold shield 74 provides an aperture stop and exit pupil for the optical system 50. A Dewar window 72 allows the infrared energy to enter the Dewar flask 70 providing the final vacuum seal. A gimbal assembly 84 provides a mechanism to gimbal the optical system 50 with respect to a housing 86.

It should be appreciated that infrared energy (i.e. electromagnetic energy) emanating from an object (not shown) propagates through space and eventually strikes the window (or dome) 48. The infrared energy enters the window 48 and impinges on lens 52. The lens 52 and the lens 54 cooperate to redirect the infrared energy such that the axial rays 66 of the infrared energy are focused such that an intermediate focal plane is created. Lens 56a redirects the infrared energy such that the chief rays 64 are parallel to the optical axis 68 (and each other) when they reach the dielectric disc 20. The infrared energy traverses the dielectric disc 20 which operates in a manner as described hereinabove in connection with FIGS. 2A-2D. The infrared energy further traverses lens 56, the pair of folding mirrors 59a, 59b, lens 58 and lens 60. The infrared energy enters the Dewar flask 70 via the Dewar window 72 and passes through the aperture stop (and exit pupil) provided by the cold shield 74 wherein the infrared energy is focused upon the detector array 78 when the dielectric disc 20 is in the in-focus position. Alternatively, the infrared energy is projected upon the detector array 78 as an unfocused spot when the dielectric disc 20 is in the out-of-focus position.

Constant magnification between the in-focus and out-of-focus images is maintained by inserting the dielectric disc 20 in a region between lens 56a and 56b. In this region all chief rays are parallel to the optical axis 68 and are then unaffected by the thickness of the dielectric disc 20 thereby allowing image defocus without shifting the chief ray height on the detector array 78 located in the in-focus focal plane. The amount of defocus is determined by the refractive indices and thicknesses of the first and second portion of the dielectric disc 20 and here selected to cause the optical blur diameter to increase by a factor of ten without a change in magnification.

A 100% cold shield efficiency is achieved by using the detector cold shield 74 as the aperture stop and exit pupil of the optical system 50 with the entrance pupil (not shown) projected in front of the optical system 50 by the reimaging lens configuration. The fixed separation between the cold shield (aperture stop) and the detector plane also provides a constant F/number as required to ensure a constant sensor DC response between the in-focus and out-of-focus images. Constant optics transmittance, also required for constant DC response, may be readily achieved by fabricating both portions of the rotating dielectric disc 20 from the same, low-loss material (e.g., zinc selenide or silicon) with identical anti-reflection coatings applied to all surfaces. For example, coating both portions of the same material in the same batch process will minimize coating variations and result in readily achievable transmittance differences of less than one percent.

Since a flat dielectric disc (i.e., with no optical power) is used to produce the focus shift, the dielectric disc 20 may be rotated continuously at a constant rate thereby minimizing the mechanical drive and servo control requirements. The "dead time" which occurs when the optical clear aperture straddles the line between the two thicknesses (i.e., during the transition from in-focus to out-of-focus or vice versa) may readily be adjusted to be concurrent with the detector focal plane array readout when operating in a preferred "snapshot" mode as illustrated by the timing diagram in FIG. 2D. (In the "snapshot" mode all elements in the focal plane array integrate at the same time and are turned off during readout). In this way the effect of the dead time can be either totally eliminated and minimized.

The detector array 78, here having 256×256 elements, but may alternatively having other arrangements, provides a plurality of signals with a signal corresponding to each one of the elements. Thus, each element provides a signal indicative of the amount of infrared energy incident upon that element. It should be appreciated that each element corresponds to a pixel (i.e. picture element) which can be used to create a picture of a scene within the field of view of the optical system 50. The output signals of the detector array 78 are fed to the digital processor and controller 14 wherein said signals are processed in a manner as described in connection with FIG. 2C.

It should now be apparent, because the offset correction is updated on every other frame basis, 1/f temporal noise is reduced at all frequencies below one-half the subtracted frame rate and large changes in the background radiance can be accommodated.

Figure 5:
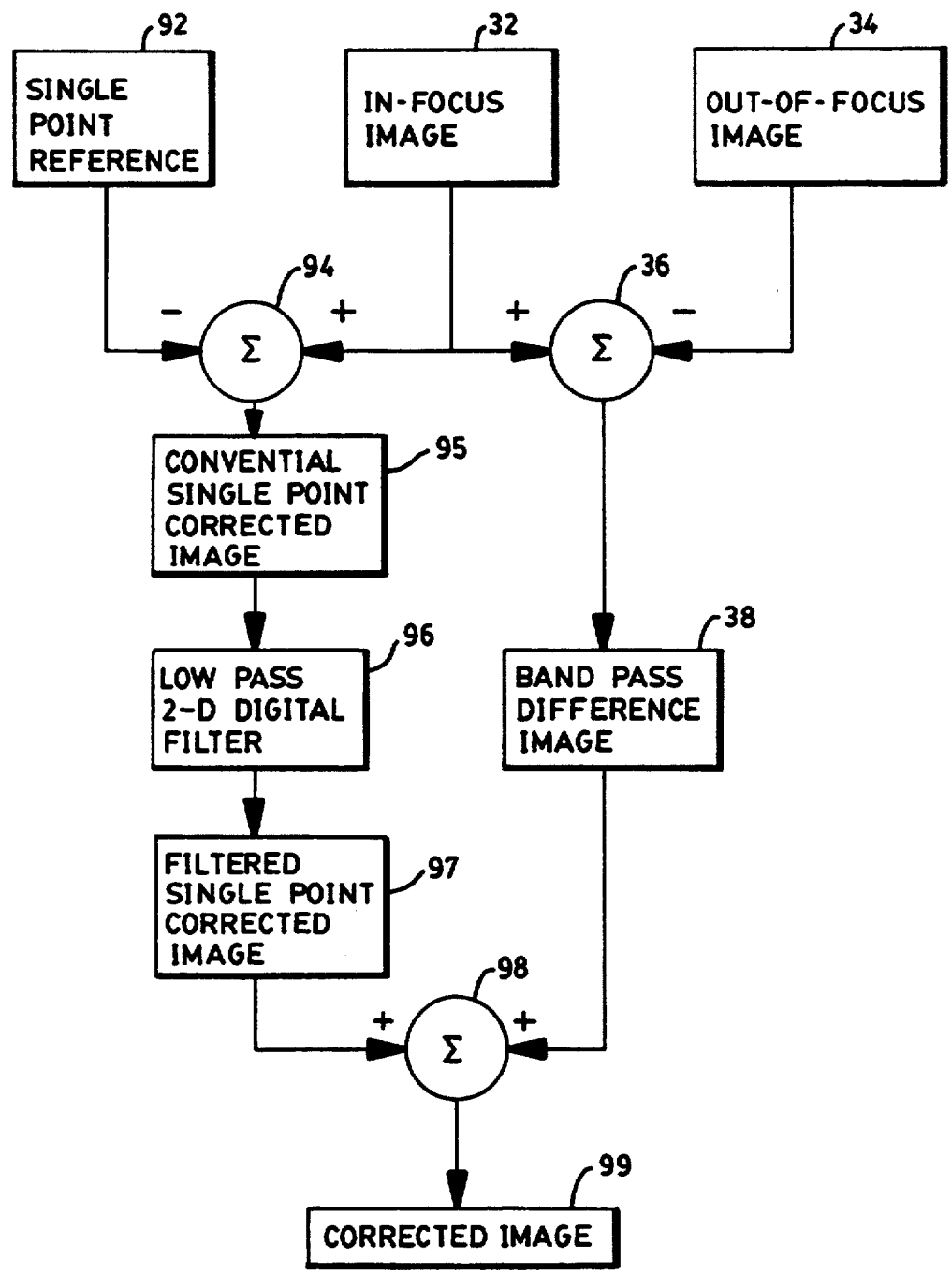
FIG. 5 is a flow chart diagram showing an alternative technique for processing images according to the invention.

Referring now to FIG. 5, an alternative technique is described incorporating the inventive concept described hereinabove. It should be apparent that subtracting an out-of-focused image 34 from an in-focused image 32 by subtractor 36 provides a band pass difference image 38 as described hereinabove in connection with FIG. 3C. The resulting bandpass difference image 38 is then relatively free of fixed pattern noise as noted hereinabove but is missing low spatial frequency scene information which may be desired in certain applications (e.g., for visual display and viewing systems). To compensate for the latter, a conventional single point reference image 92 can be occasionally provided by using known techniques and differenced with an in-focused image 32 by subtractor 94. The resulting conventional single point corrected image 95 can be passed through a low pass two dimensional digital filter 96 by passing a local window (i.e. subarray of pixels) across the image and taking the mean value for the value of the pixel under the center of the window. The resulting image, here referred to as a filtered single point corrected image 97 provided from the low pass two dimensional digital filter 96 can then be summed with the band pass difference image 38 in a summer 98 to provide a corrected compensated image 99 which is then processed further. It should be appreciated that by also using the single point reference image, the low frequency error characteristics can be compensated for as well as the high frequency error characteristics. That is, insofar as external scene detail is concerned, selection of the low pass two dimensional digital filter 96 window size to match the out-of-focus image blur size will result in reconstruction of the low frequency scene detail (except for DC) in the corrected image 99. The advantage of the technique presented is that the low pass two dimensional digital filter 96 operating on the conventional single point corrected image 95 will low pass filter the residual fixed pattern noise along with the external scene detail thereby attenuating and correlating the fixed pattern noise in the filtered output image 97 before addition to the band pass difference image 38. In this way, the low spatial frequency scene detail may be reconstructed without adding high frequency (i.e., uncorrelated) fixed pattern noise to the corrected image 99.

Figure 6:
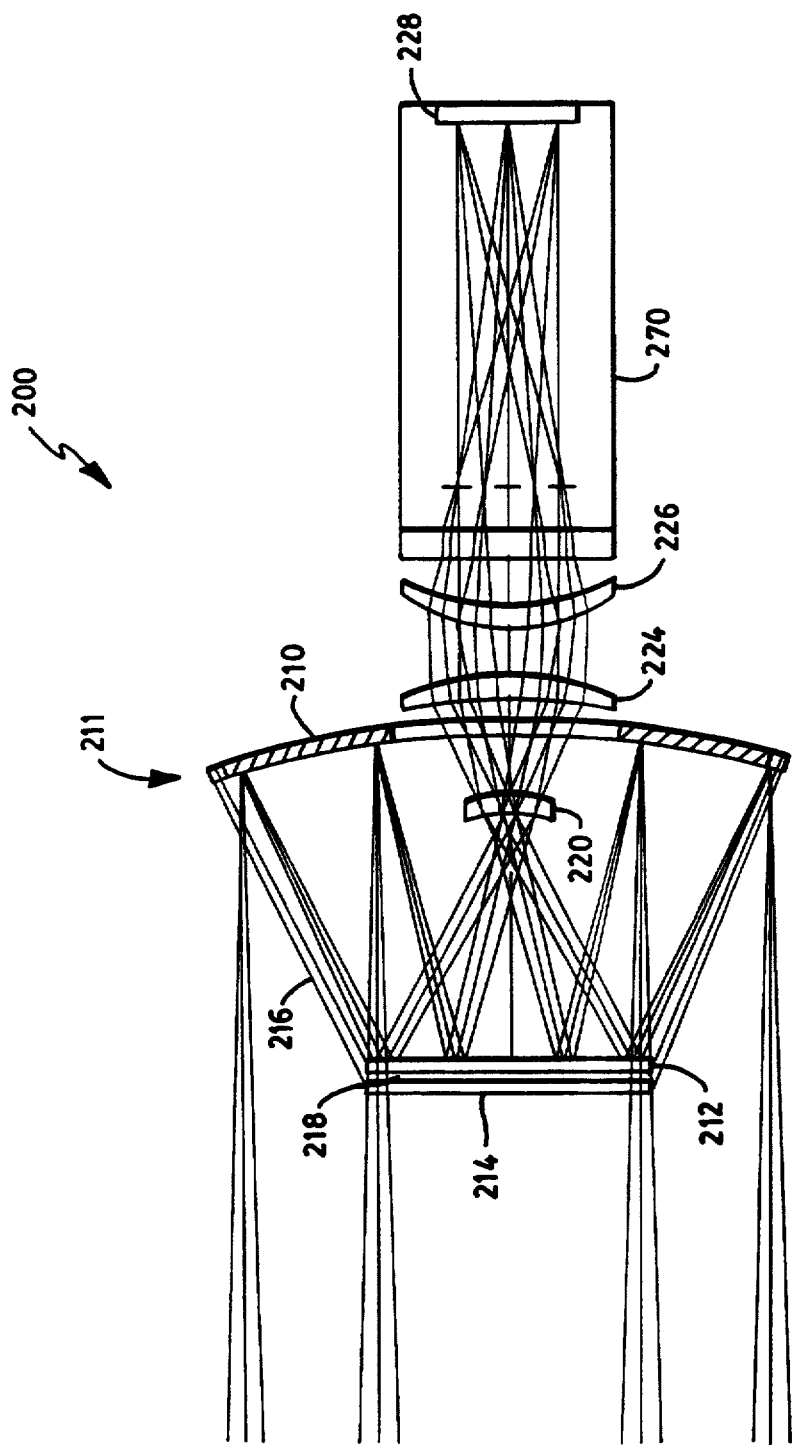
FIG. 6 is a diagrammatical cross-sectional view of an alternative embodiment of an optical system according to the invention.

Referring now to FIG. 6, an alternative embodiment for defocusing an image on a focal plane array is shown wherein a secondary optical element, lens or lens group of a catadioptric telescope is dithered to focus and defocus the image on the focal plane array. An optical system 200 is shown to include a primary mirror 210 and a secondary mirror 212 disposed to provide a catadioptric telescope arrangement 211. The primary mirror 210 and the secondary mirror 212 are effective to form an intermediate image plane of an object within a scene in front of the catadioptric telescope arrangement 211. The primary mirror 210 here has a diameter of 76 millimeters and the secondary mirror 212 here has a diameter of 35.5 millimeters. The secondary mirror 212 is mounted to a mounting member 214 which is mounted to the primary mirror 210 with legs 216 in a known manner. Disposed between the mounting member 214 and the secondary mirror 212 is a piezoelectric stack 218 which, in response to a control signal, positions the secondary mirror 212 in various or multiple positions. A lens 220, a lens 222 and a lens 224, cooperate to relay the image plane from that position formed by the primary mirror 210 and the secondary mirror 212 to an image plane wherein a focal plane array 228 is disposed. The focal plane array 228 is disposed within a Dewar flask 270 and here is a 256×256 element InSb detector array but any number of element array could be used. The Dewar flask 270 is similar to the Dewar flask 70 as described in FIG. 4A with the focal plane array detector array 228 taking the place of the detector array 78 (FIG. 4A).

To defocus the image on the focal plane array 228, the secondary mirror 212 is moved along it's axis by the piezoelectric stack 218. It should be appreciated that with no power applied, the piezoelectric stack 218 is disposed in a first position which in turn positions the secondary mirror 212 such that the optical system 200 focuses (or defocuses) the image plane coincident with the focal plane array 228. With power applied, the piezoelectric stack 218 is disposed in a second position which in turn moves the secondary mirror 212 to a second position. With the secondary mirror 212 in the second position, the intermediate image plane is moved and correspondingly the image plane that was coincident with the focal plane array 28 is moved. The latter defocuses (or focuses) the image plane with the focal plane array 228.

It should now be appreciated that with the optical system 200 implemented in the scanning and focusing system 0 of the missile 100 in FIG. 1, with no control signal (i.e. power) applied to the piezoelectric stack 218, the secondary mirror 212 is in the first position and the image plane is focussed (or defocused) with the focal plane array 28 so that the optical system 200 operates in a normal manner. When it is desired to defocus (or defocus) the image plane with the focal plane array 228, a control signal (i.e. power) is applied to the piezoelectric stack 218 and the secondary mirror 212 is moved to the second position and the image plane is defocused (or focused) with the focal plane array 228. Through this arrangement, the image plane is defocused with the focal plane array only when required and not necessarily every other frame as described with the rotating dielectric disc 20 (FIG. 4A). With the optical system 200, the compensation technique can be implemented during portions of missile flight wherein large changes in background radiance levels is expected. During portions of missile flight wherein small changes in background radiance levels is experienced, the optical system 200 can remain in focus providing more time for collecting target data. It should also be noted the optical system 200 may be packaged in less volume than the optical system 50 (FIG. 4A) which may be desirable in some instances.

The ratio of the image plane movement with the secondary mirror movement is set through control of the local speed of f/# in the region between the primary mirror 210 and the secondary mirror 212 and the region between the secondary mirror 212 and the lens 220. The conjugate ratio that the lens 220, the lens 224 and the lens 226 are operating at (i.e. front focal length vs. back focal length) are set to control the image plane shift magnification.

The compensation technique includes the subtraction of alternate focussed and defocused scenes to eliminate low frequency background and to enhance high frequency edges within the scene. As described hereinabove, when using defocus to subtract low frequency scene content, the image magnification should not change significantly between the in focus position and the out of focus position. The arrangement of the secondary mirror 212 with the primary mirror 210 and the positions of lenses 220, 224 and 226 are selected to minimize the change of image magnification between the in focus position and the out of focus position.

It should be appreciated that infrared energy (i.e. electromagnetic infrared energy) emanating from an object (not shown) propagates through space and eventually strikes the primary mirror 210. The infrared energy traverses the optical system 200 wherein the infrared energy enters the Dewar flask 270 and is focused (or defocused) upon the focal plane array 228 when the secondary mirror 212 is in the first position in an infocus arrangement and, alternatively, the infrared energy is projected upon the focal plane array 228 as an unfocused (or focused) spot when the secondary mirror 212 is in the second position in an out-of-focus arrangement.

The output signals of the focal plane array 228 are fed to the digital processor and controller 14 (FIG. 1) wherein said signals are processed in a manner as described in connection with FIG. 2C when implementing the correction technique or alternatively in a known manner to provide the requisite control signals to control the course of the missile 100 (FIG. 1).

It should also be appreciated that other techniques for dithering the secondary mirror 212 may be implemented. For example, a magnetic mechanism (voice coil, torquer motor) (not shown) could be used to place the secondary mirror 212 in multiple positions. Also, a lens or lens group may be dithered in the same manner as described for the secondary mirror using the same type of mechanization. This has the same effect and may provide some advantages depending on the system layout and design. Although shown implemented for a catadioptric system the Dither method for focus/defocus nonuniformity correction can be applied effectively moving a lens or lens group of a completely refractive system as shown previously in FIG. 4A. In all cases the dither method of focus/defocus nonuniformity compensation provides tailored control over the amount of defocus that can be achieved by position control over secondary, lens or lens group thus optimizing system performance for various system requirements with the same mechanization. Also, the frequency of the dither can be controlled to again maximize system performance given different system mission requirements and minimize the system impact of the nonuniformity correction operation.

Figure 7:
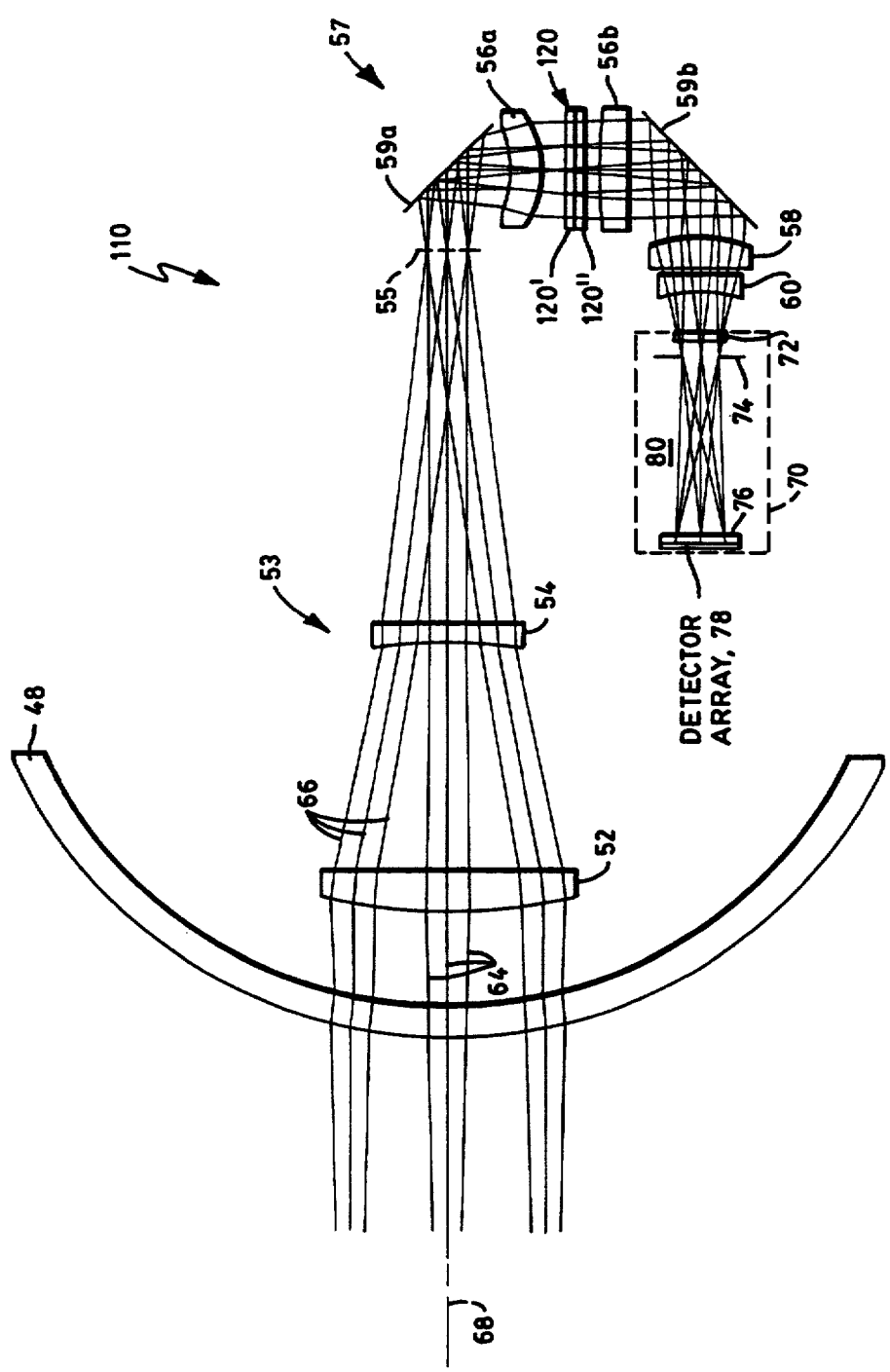
FIG. 7 is a diagrammatical cross-sectional view of a second alternative embodiment of an optical system using a liquid crystal phased array according to the invention.

Referring now to FIG. 7, another alternative embodiment for defocusing an image on a detector array (i.e. focal plane array) is shown wherein a liquid crystal phased array is used as a focusing and defocusing element. An optical system 110 is shown similar to the optical system 50 (FIG. 4A) wherein like elements are numbered the same, but here the rotating dielectric disc 20 (FIG. 4A) is replaced with a liquid crystal phased array 120. Referring now also to FIG. 1, the optical system 110 which is implemented in the focusing system 10 of the missile 100 includes a forward optics assembly 53 including lens 52 and lens 54. The lens 52 is here fabricated from silicon and is acting as a primary objective lens for the optical system 50. The lens 54, here fabricated from germanium and acting as a secondary objective lens, is disposed adjacent the lens 52 for focusing the axial rays 66 of infrared energy onto a focal plane 55. The optical system 110 further includes the liquid crystal phased array 120 which operates in a manner as to be described hereinafter. Suffice it to say, the liquid crystal phased array 120 is effective to change the focal point of the optical system 110. The optical system 110 further includes an aft optics assembly 57 including lenses 56a and 56b here fabricated from silicon and disposed juxtapositional with the liquid crystal phased array 120 and operate as described earlier with FIG. 4A. The aft optics assembly 57 further includes a pair of folding mirrors 59a, 59b disposed within the beam of infrared energy to reverse the direction of the beam of infrared energy. A lens 58, here fabricated from silicon, and a lens 60, here fabricated from germanium, cooperate to refocus the beam of infrared energy into a Dewar flask 70. The Dewar flask 70 includes an evacuated chamber 80 for enabling a suitable cryogenic substance to cool a detector array 78. A spectral filter 76 is disposed adjacent the detector array 78 for eliminating undesired signals. A cold shield 74 for limiting infrared energy impinged upon the detector array 78 provides an aperture stop and exit pupil for the optical system 110. A Dewar window 72 allows the infrared energy to enter the Dewar flask 70 and provide the final vacuum seal.

It should be appreciated that infrared energy (i.e. electromagnetic infrared energy) emanating from an object (not shown) propagates through space and eventually strikes the dome 48 and operating in a manner similar to that as described with FIG. 4A, the infrared energy traverses the optical system 110 wherein the infrared energy enters the Dewar flask 70 and is focused upon the detector array 78 when the liquid crystal phased array 120 is in an in-focus arrangement and, alternatively, the infrared energy is projected upon the detector array 78 as an unfocused spot when the liquid crystal phased array 120 is in an out-of-focus arrangement.

The output signals of the detector array 78 are fed to the digital processor and controller 14 wherein said signals are processed in a manner as described in connection with FIG. 2C.

A liquid crystal phased array 120 includes a plurality of segments, each segment providing a phase change to an optical beam incident thereon and typically each segment is arranged so that all of the segments steer the optical beam in a constant direction thereby redirecting the optical beam. The liquid crystal phased array 120 is arranged to steer specific segments of an incident beam in different directions in an "on or defocus" state and to pass an incident beam unaltered in an "off or focus" state.

Construction of a liquid crystal phased array is disclosed in U.S. Pat. No. 5,093,740, entitled "Optical Beam Steerer Having Subaperture Addressing", filed Feb. 28, 1991, for inventors Terry A. Dorschner et al., which patent is incorporated herein by reference.

Figure 8:
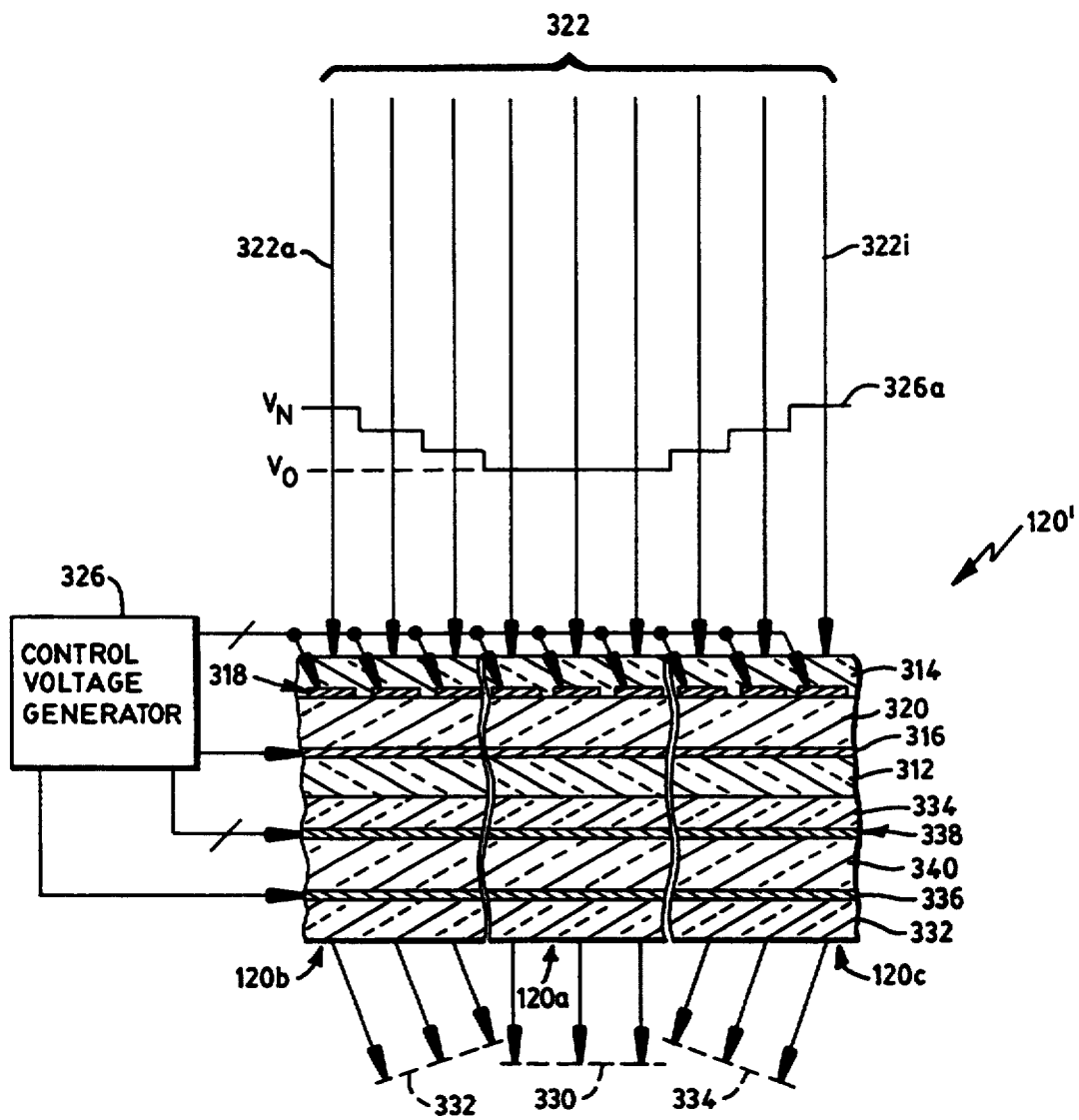
FIG. 8 is a diagrammatical cross-sectional view of a liquid crystal phased array.

Referring to FIG. 8, there is shown, in diagrammatical cross-sectional view, a liquid crystal beam steering device 120' (also referred to as a liquid crystal phased array 120') of the type described for use in the present invention. Liquid crystal phased array 120' comprises a liquid crystal cell having windows 312 and 314 which are optically transparent at the frequency range of interest. Common electrode 316, affixed to window 312, is electrically conductive and optically transparent. Electrodes (not numbered), referred to collectively as electrodes 318, affixed to window 314, comprise a plurality of electrically-conductive, optically-transparent stripes. The space between windows 312 and 314 is filled with a layer of liquid crystal molecules 320, illustratively long, thin, rod-like organic molecules of the so-called "nematic" phase. The referenced Dorschner et al. patent teaches the use of alignment layers on the inner surfaces of windows 312 and 314 to properly align the liquid crystal molecules at the boundaries of layer 320.

The liquid crystal phased array 120' is responsive to a light source as shown in FIG. 7 which provides a light beam 322, here in the infrared frequency range. Light beam 322, represented in part by rays 322a... 322i, is directed onto window 314 of liquid crystal phased array 120'. It is characteristic of liquid crystal molecules whose orientation is well-defined by alignment layers as described above, that the application of an electric field perpendicular to the alignment layer affects the speed of light whose polarization is parallel to the alignment layers propagated therethrough, and hence, the retardance. Thus, in the simplified example of FIG. 8, the application of different potentials between common electrode 316 and the individual stripe electrodes 318, from control voltage generator 326 results in differential electric fields in the regions between the individual stripe electrodes 318 and common electrode 316, thereby creating local variations of the refractive index in the liquid crystal layer 320. For ease of understanding, a limited number of stripe electrodes 318 are shown in FIG. 8, whereas, in the actual liquid crystal phased array embodying the present invention, there may be many hundreds of such stripes.

In the present simplified example, the potentials applied to the electrodes 318 onto which rays 322a... 322i are incident, shown diagrammatically as staircase waveform 326a, are such as to cause a center wavefront 330 being parallel with the wavefront of the incident wavefront, a second wavefront 332 tilted toward the center wavefront 330, and a third wavefront 334 tilted toward the center wavefront 330 as shown emerging from the liquid crystal phased array 120. If an identical potential is applied to all electrodes 318, the refractive index of the liquid crystal layer 320 is uniform, and beam 322 is undeflected. It is therefore seen that the liquid crystal phased array 120' provides selective beam steering in accordance with the electrical potentials applied to the electrodes 318.

It should be appreciated that the latter description describes the tilting of wavefronts in a first or azimuth direction. To provide two dimensional beam spreading (i.e. tilting of wavefronts in an elevation direction), a second liquid crystal cell includes windows 332 and 334 which are optically transparent at the frequency range of interest. Common electrode 336, affixed to window 332, is electrically-conductive and optically transparent. Electrodes 338, affixed to window 334, comprise a plurality of electrically-conductive, optically-transparent stripes which are disposed perpendicular to electrodes 318. The space between windows 332 and 334 is filled with a layer of liquid crystal molecules 340, illustratively long, thin, rod-like organic molecules of the so-called "nematic" phase. As described with light beam 322 in an azimuth elevation, to control the light beam 322 in an elevation direction, the light beam 322 is directed into window 334 of liquid crystal phased array 120. The application of an electric field perpendicular to the alignment layer affects the speed of light whose polarization is parallel to the alignment layers propagated therethrough, and hence, the retardance. Thus, in the simplified example of FIG. 8, the application of different potentials between common electrode 336 and the individual stripe electrodes 338, from control voltage generator 326 results in differential electric fields in the regions between the individual stripe electrodes 338 and common electrode 336, thereby creating local variations of the refractive index in the liquid crystal layer 320. The latter is then effective to control the beam 322 in an elevation direction.

From the foregoing, it should now be appreciated that if an identical potential is applied to all electrodes 318 and all electrodes 338, the refractive index of the liquid crystal layer 320 and the liquid crystal layer 340 are uniform, and beam 322 is undeflected or in an "off or focus" state. If varying appropriate potentials are applied to each of the electrodes 318 and each of the electrodes 338, the refractive index of the liquid crystal layer 320 and the liquid crystal layer 340 will vary, and beam 322 is deflected or in an "on or defocus" state. As such, the liquid crystal phased array 120' is effective to focus the infrared energy upon the detector array 78 when the liquid crystal phased array 120' is in the "off or focus" state and effective to defocus the infrared energy upon the detector array 78 when the liquid crystal phased array 120' is in the "on or defocus" state.

The liquid crystal phased array 120' is subdivided into an odd number, n (here shown as 3), of equal width subarrays. One subarray, shown as a central segment 120a, steers in the forward direction but produces a far field angular distribution n times than the full aperture. A second and a third segment, segment 120b and segment 120c, respectively, shown on either side of the center segment, steer their respective beams in directions corresponding to the interference nulls of the far field intensity pattern of the central segment 120a. Each successive segment out from the center is steered to the first null of the previous segment. These steering angles are multiples of $n\lambda/L$, where n is the number of segments, $\lambda$ is the wavelength of the signal propagating therethrough and L is the full width of the liquid crystal phased array 120. For these steering angles, each one of the segments 120a, 120b and 120c can be divided in to an integral number of subsegments, each of which includes a zero to $2\pi$ linear phase ramp for the design wavelength. A phase ramp configuration for n=3 produces a far field pattern which is 6 times broader than a diffraction limited pattern for the full aperture measured at the first null. It should be appreciated that the steering segments can be arranged spatially in any order. If the individual steering segments are properly phased, the far field pattern will be a relatively flat distribution with a width to the first null of $n(n+1)/2$ times the diffraction limited width of the full aperture. Since the liquid crystal phased array 120' will have only two states which are chosen based on mission or system requirements, it can be hard wired and will require minimum control circuitry. It was observed that for a three segment configuration of the liquid crystal phased array 120', the optical blur was spread about a factor of six and for a five segment configuration of the liquid crystal phased array 120', the optical blur was spread about a factor of 15 from the diffraction limited condition. Using the rotating optical disc 20 as shown in FIG. 4A, the optical blur was spread about a factor of ten.

It should be appreciated that if the liquid crystal phased array 120' is provided to control the optical blur of vertical polarized signals then a liquid crystal phased array 120" (FIG. 7) is provided to control the optical blur of horizontal polarized signals. The liquid crystal phased array 120" is constructed similar to the liquid crystal phased array 120' with the exception that the alignment of the liquid crystal molecules of the respective layers in the liquid crystal phased array 120" are oriented perpendicular (i.e. rotated in space by 90 degrees) with the layer of liquid crystal molecules 320 and the layer of liquid crystal molecules 340. The control voltage generator 326 in a similar manner controls the optical blur of the unfocused state provided by the liquid crystal phased array 120". The liquid crystal phased array 120' and the liquid crystal phased array 120" provide the liquid crystal phased array 120.

Although the liquid crystal phased array 120 is shown at the present location, the liquid crystal phased array 120 may be located at any location within the beam of infrared energy that is in the far field of the detector array 78. Also, the liquid crystal phased array 120' can be disposed at one location and the liquid crystal phased array 120" can be located at a different location, for example, between lens 58 and lens 60.

As described hereinabove with FIG. 2C, a simple sample by sample (i.e., frame by frame) subtraction of an out-of-focus image 34 from an in-focus image 32 by a subtractor 36 to provide a band-pass difference image 38, the fixed pattern noise can be eliminated. Again, it should be appreciated that pattern noise correction must be done on each detector element individually without crossing detector boundaries. A corresponding modulation transfer function (MTF) curve for each image illustrates that, in addition to correction, the process also provides a spatial (two-dimensional) band-pass filter which not only removes the DC offset but also attenuates lower spatial frequencies. The extent of the low frequency removal depends on the amount of defocus selected for the out-of-focus image (with the obvious degenerate case of no defocus resulting in the elimination of all scene response).

The optical system 110 provides an advantage over the previous disclosed embodiments, since there are no moving parts. Like optical system 200, the optical system 110 does not have to be continuously operated and the calibration technique is only implemented when required as controlled by the control voltage generator 326. It should be appreciated that the current liquid crystal phased array technology must be heated to operate in low temperature environments. The optical system 110 provides accurate real time calibration of the detector array 78 upon command.

Having described this invention, it will now be apparent to one of skill in the art that various elements of the optical system may be changed without affecting this invention. Furthermore, the number and disposition of the lenses could be changed to accommodate a predetermined arrangement. It is felt, therefore, that this invention should not be restricted to its disclosed embodiment, but rather should be limited only by the spirit and scope of the appended claims.

What is claimed is:

1. An imaging optical system comprising:
   (a) an array of photodetectors, each photodetector having a surface;
   (b) means for focusing and periodically defocussing a beam of electromagnetic energy on the surface of at least one of the photodetectors, said focusing and periodically defocussing means comprising:
      (i) a primary mirror and a secondary mirror disposed in a catadioptric telescope arrangement and a plurality of relay lenses disposed within the beam of the electromagnetic energy; and
      (ii) means for dithering the secondary mirror for defocusing the beam of electromagnetic energy upon the surface of at least one of the photodetectors.

2. The optical system as recited in claim 1 further comprising:
   (a) means, responsive to the array of photodetectors, for providing an in-focus image comprising an array of pixels;
   (b) means, responsive to the array of photodetectors, for providing an out-of-focus image comprising an array of pixels; and (c) means, responsive to the in-focus image and out-of-focus image, for providing a difference image comprising an array of pixels.

3. The imaging optical system as recited in claim 2 further comprising:
   (a) means for providing a single point reference image;
   (b) means for differencing the single point reference image with the in-focus image and passing the resultant thereof through a low pass digital filter to provide a filtered image; and
   (c) means for summing the difference image with the filtered image to provide a corrected image.

4. An imaging optical system for receiving a beam of electromagnetic energy comprising:
   (a) an optics assembly disposed within the beam of electromagnetic energy comprising a plurality of lenses disposed within the beam of electromagnetic energy to focus an image at an image plane;
   (b) a detector array disposed within the beam of the electromagnetic energy at the image plane to detect the electromagnetic energy; and
   (c) means for dithering one of the plurality of lenses for defocusing the image at the image plane.

5. The imaging optical system as recited in claim 4 further comprising:
   (a) means, responsive to the detector array, for providing an in-focus image comprising an array of pixels and for providing an out-of-focus image comprising an array of pixels; and
   (b) means, responsive to the in-focus image and out-of-focus image, for providing a difference image comprising an array of pixels.

6. The imaging optical system as recited in claim 5 further comprising:
   (a) means for providing a single point reference image;
   (b) means for differencing the single point reference image with the in-focus image and passing the resultant thereof through a low pass digital filter to provide a filtered image; and
   (c) means for summing the difference image with the filtered image to provide a corrected image.

7. A method of operating an imaging optical system comprising the steps of:
   (a) focusing a beam of infrared energy with a plurality of lenses on an array of photodetectors and forming an in-focus image comprising an array of pixels, each pixel represented by a digital word;
   (b) periodically defocusing the beam of infrared energy by dithering one of the plurality of lenses on the array of photodetectors and forming an out-of-focus image comprising an array of pixels, each pixel represented by a digital word; and
   (c) differencing the digital word of each pixel of the out-of-focus image with the digital word of a corresponding pixel of the in-focus image to provide a difference image comprising an array of pixels, each pixel represented by a digital word indicative of a limited field of view of the optical radar system.

8. The method as recited in claim 7 further comprising the steps of:
   (a) providing a single point reference image comprising an array of pixels, each pixel represented by a digital word;
   (b) differencing the digital word of each pixel of the single point reference image with the digital word of a corresponding pixel of the in-focus image and passing the resultant thereof through a low pass digital filter to provide a filtered image comprising an array of pixels, each pixel represented by a digital word; and
   (c) summing the digital word of each pixel of the difference image with the digital word of a corresponding pixel of the filtered image to provide a corrected image.

* * * * *